H. M. PAINE.
ELECTROMAGNET.
No. 103,230.          Patented May 17, 1870.
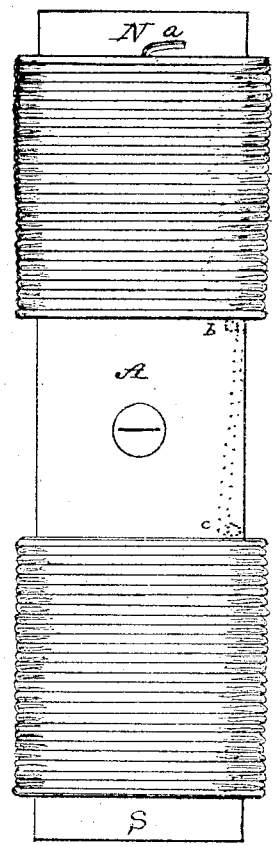
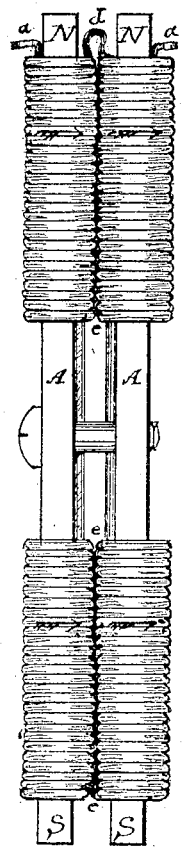
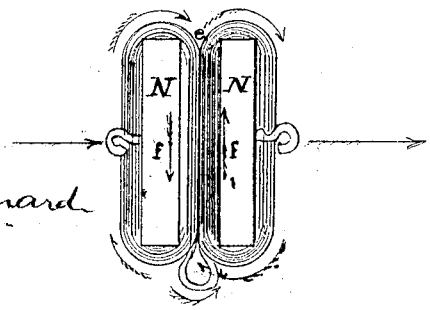

United States Patent Office.

HENRY MONROE PAINE, OF NEWARK, NEW JERSEY, ASSIGNOR TO HIMSELF AND M. S. FROST, OF NEW YORK CITY.

Letters Patent No. 103,230, dated May 17, 1870.

IMPROVEMENT IN ELECTRO-MAGNETS.

The Schedule referred to in these Letters Patent and making part of the same

I, HENRY MONROE PAINE, of Newark, New Jersey, have invented certain Improvements in Electro-Magnets, of which the following is a specification.

The object of my invention is to obtain the same relative results by compounding electro-magnets as are acquired by the compounding of permanent magnets. In order to accomplish this result, I wind the poles of two or more rectangular bars, A, Figures 1 and 2, with insulated wire, commencing at $a$, fig. 1, on each bar, and winding around the requisite number of turns to reach the guide-pin $b$, and then pass down to guide-pin $c$, and wind in same direction till the same number of turns has been made on the opposite end of the bar; then return up to guide-pin $c$ and $b$, and up to commencement $a$. Having thus wound two or more bars, (all being wound in the same direction,) I bind them together, as shown in fig. 2, and connection is made between the coils at $d$.

I do not propose to obtain any valuable result from magnetic induction by this method of constructing electro-magnets, but I do claim an increased dynamical value from the action of the currents on each other.

It is well known that electrical currents moving in opposite directions accelerate each other, and, although the currents are moving in the same direction around the axis of all the bars, yet, at the juncture $e$, figs. 2 and 3, of the combination, their course is directly opposite, as shown by the arrows $f f$ in fig. 3, which is an end view of fig. 1.

I claim as my invention—

The compounding or binding together of bars, separately wound, and in the same direction, substantially in the manner and for the purpose hereinbefore set forth.

HENRY MONROE PAINE.

Witnesses:
ROBERT M. BRAINARD,
JAS. STANBROUGH,
M. S. FROST.